United States Patent
Naijo et al.

(10) Patent No.: US 7,942,546 B2
(45) Date of Patent: May 17, 2011

(54) LIGHT GUIDE MEMBER HAVING LIGHT MIXING PROTRUSION, FLAT LIGHT SOURCE DEVICE, AND DISPLAY DEVICE

(75) Inventors: Shuichi Naijo, Chiba (JP); Shuji Gomi, Chiba (JP); Takeo Watanabe, Chiba (JP)

(73) Assignee: Showa Denko K.K., Tokyo (JP)

( * ) Notice: Subject to any disclaimer, the term of this patent is extended or adjusted under 35 U.S.C. 154(b) by 94 days.

(21) Appl. No.: 12/097,848

(22) PCT Filed: Dec. 26, 2006

(86) PCT No.: PCT/JP2006/326346
§ 371 (c)(1),
(2), (4) Date: Jun. 17, 2008

(87) PCT Pub. No.: WO2007/074933
PCT Pub. Date: Jul. 5, 2007

(65) Prior Publication Data
US 2009/0225530 A1 Sep. 10, 2009

Related U.S. Application Data

(60) Provisional application No. 60/755,791, filed on Jan. 4, 2006.

(30) Foreign Application Priority Data

Dec. 27, 2005 (JP) ................................ 2005-375905

(51) Int. Cl.
*F21V 9/00* (2006.01)

(52) U.S. Cl. ....... 362/231; 362/97.2; 362/97.3; 362/247

(58) Field of Classification Search .................. 362/231, 362/97.1, 555, 558, 612–613, 97.2–97.4, 362/561, 241, 243–247, 330, 339, 621, 628, 362/249.01, 249.02, 249.06, 249.14; 385/146
See application file for complete search history.

(56) References Cited

U.S. PATENT DOCUMENTS 6,953,264 B2 * 10/2005 Ter-Hovhannisian ........ 362/241
7,025,482 B2    4/2006 Yamashita et al.
(Continued)

FOREIGN PATENT DOCUMENTS

JP          3151830 B2      1/2001
(Continued)

OTHER PUBLICATIONS

Techno-Frontier Symposium 2005, Thermal Design and Countermeasure Technology Symposium, Issue Date: Apr. 20, 2005 (Japan Management Association), Session G3: Latest Design Case of Heat Radiation Mounting I (pp. G3-3-1 to G3-3-4).

*Primary Examiner* — Thomas M Sember
(74) *Attorney, Agent, or Firm* — Sughrue Mion, PLLC

(57) ABSTRACT

A light guide member capable of reducing an unevenness of luminescent color and further a nonuniformity in luminance when obtaining a white color by a color mixture using a plurality of light sources. Also disclosed are a flat light source device and a display device. A protrusion (4) of a cylindrical shape is formed upward a plurality color of LED light sources 5R, 5G, 5B, e.g., RGB color at a backside face of a light guide member (1), and a conical depression (3) is disposed at the position directly over the protrusion. Lights of each color from LED light sources 5R, 5G, 5B are mixed at the protrusion (4), thereafter reflect at the depression (3) and propagate in a horizontal direction at a light guide portion (2).

15 Claims, 11 Drawing Sheets

U.S. PATENT DOCUMENTS

| | | | |
|---|---|---|---|
| 2002/0044454 A1 * | 4/2002 | Roller et al. | 362/540 |
| 2005/0265044 A1 * | 12/2005 | Chen et al. | 362/558 |
| 2005/0276068 A1 | 12/2005 | Chen et al. | |
| 2006/0083003 A1 * | 4/2006 | Kim et al. | 362/327 |
| 2007/0047232 A1 * | 3/2007 | Kim et al. | 362/305 |

FOREIGN PATENT DOCUMENTS

| | | |
|---|---|---|
| JP | 2002-298629 A | 10/2002 |
| JP | 2003-8068 A | 1/2003 |
| JP | 2003-8081 A | 1/2003 |
| JP | 2004-31180 A | 1/2004 |
| JP | 2004-133391 A | 4/2004 |
| JP | 2004-157472 A | 6/2004 |
| JP | 2004-158336 A | 6/2004 |
| JP | 2005-340829 A | 12/2005 |
| WO | 98/19105 A1 | 5/1998 |

\* cited by examiner

LIGHT GUIDE MEMBER HAVING LIGHT MIXING PROTRUSION, FLAT LIGHT SOURCE DEVICE, AND DISPLAY DEVICE

CROSS REFERENCES OF RELATED APPLICATION

This application is an application filed under 35 U.S.C. §111(a) claiming benefit pursuant to 35 U.S.C. §119(e)(1) of the filing date of Provisional Application 60/755,791 filed on Jan. 4, 2006 pursuant to 35 U.S.C. §111(b).

TECHNICAL FIELD

The present invention relates to a light guide member for a flat light source device, a flat light source device using the light guide member, and a display device provided with the flat light source device that are used as a back light for a liquid crystal display for instance.

BACKGROUND OF THE INVENTION

In recent years, a light emission efficiency of a light-emitting diode device has been extremely improved, and an application of the luminous diode device to an illumination is being progressed. In particular, in the case in which there is used a light emitting diode device as a back light for a liquid crystal display, a satisfactory gamut of reproducible colors and a high speed response can be implemented and it is expected that a high quality display be achieved.

Conventionally, the main stream of such a back light for a liquid crystal display has been the so-called edge light type in which a cold cathode tube as an light source is disposed on the edge face of the chassis for thinning and low power consumption of the apparatus. However, a demand of enlarging a liquid crystal display has been increased in recent years, and the edge light type has a limitation in the case in improving a luminance and a uniformity in the luminance. Therefore, an adoption of a direct lighting type light has been examined for a large size liquid crystal display.

FIG. 12 is a cross sectional view for showing a configuration of a conventional flat light source device of a direct lighting type used in a liquid crystal display (TECHNO-FRONTIER SYMPOSIUM 2005, Thermal Design and Countermeasure Technology Symposium, Issue Date: Apr. 20, 2005 (Japan Management Association), Session G3: Latest Design Case of Heat Radiation Mounting I (pp. G3-3-1 to G3-3-4), and so on). The flat light source device 101 is disposed directly below a liquid crystal panel 21. In the flat light source device 101, LED light sources 5 using a light emitting diode device are disposed in an array pattern on a bottom face of a chassis 12. Moreover, the bottom face and side faces of the chassis 12 are covered with a reflecting sheet 13. Furthermore, over the LED light source 5, a diffusing sheet 14 and a prism sheet 15 are disposed in the range of 1 to 5 cm in general apart from the LED light source 5.

In the case in which a light is emitted from the LED light source 5, the emitted light travels directly toward the diffusing sheet 14, or is reflected by the reflecting sheet 13 and travels toward the diffusing sheet 14. The emitted light is then irregularly reflected in the diffusing sheet 14, and is inclined in a vertical direction by passing through the prism sheet 15. The emitted light then enters a liquid crystal panel 21. Lights emitted from different LED light source 5 are mixed in a space between the LED light sources and the diffusing sheet 14. The mixing is then improved by an irregular reflection in the diffusing sheet 14, thereby implementing a uniform luminance and a uniform chromaticity. Moreover, a luminance at the section directly over the LED light sources 5 is higher than that of other sections. Therefore, a uniformity in a luminance can be further improved by increasing a diffusability of the diffusing sheet 14 at the section directly over the LED light sources 5, thereby improving a uniformity of a luminance of the entire liquid crystal panel 21.

In the conventional flat light source device, the diffusing sheet is disposed and the diffusing sheet is apart from the LED light sources in order to uniform a luminance and a chromaticity as described above. However, in the case in which a color mixture is carried out by using LED light sources of a plurality of colors such as RGB, a color mixture is insufficient and unevenness of colors may be found. In addition, there is a problem that a luminance of the section directly over the LED light sources becomes higher.

Accordingly, to reduce an unevenness of luminance and the like, a luminance of the section directly over the LED light sources 5 is reduced by increasing a diffusability of the diffusing sheet 14 directly over the LED light source 5, or a so-called lighting curtain for improving a uniformity of a luminance of the entire liquid crystal panel 21 is disposed directly over the LED light sources in order to reduce a luminance of the section directly over the LED light sources in some cases. However, the above means cause a utilization efficiency of a light to be lowered.

Moreover, in the case in which the diffusing sheet is made further apart from the LED light sources, a nonuniformity in chromaticity and a nonuniformity in luminance can be reduced. However, this method causes a thickness of a back light to be enlarged, and is not preferable for a flat panel display.

In order to implement a uniform chromaticity and a uniform luminance and suppress a thickness of the flat light source device, it is effective to use a light guide plate to shut up and propagate a light emitted from a linear type light source or a dot type light source in the light guide plate, and to emit a uniform light forward from the light guide plate (Japanese Patent Publication No. 3151830).

In the above described flat light source device of a direct lighting type, in order to sufficiently implement a uniform chromaticity and a uniform luminance and suppress a thickness of the planar light source device, it is effective to dispose a light guide plate that faces to LED light sources in front of a substrate in which a plurality of LED light sources is disposed and to dispose a reflecting layer on the back face side of the light guide plate if necessary, thereby propagating a light that has been emitted from the LED light source and has traveled to the back face in the light guide plate and then extracting the light from the front face of the light guide plate.

However, even in the case in which such a light guide plate is used, in the case in which LED light sources of a plurality of colors such as RGB are used, a nonuniformity in chromaticity may be found. In addition, a luminance of the light guide plate at the position directly over the LED light sources becomes higher, and a nonuniformity in luminance cannot be canceled to a sufficient level.

As effective technology for canceling a nonuniformity in luminance, Japanese Laid-Open Patent Publication No. 2003-8081, Japanese Laid-Open Patent Publication No. 2003-8068, and Japanese Laid-Open Patent Publication No. 2004-133391 disclose a lens for changing a direction of a light emitted from an LED light source to a horizontal direction. As shown in FIG. 13(a), a lens 31 is provided with a depression 32 in a funnel shape on the upper face and a saw tooth shaped portion 33 on the periphery. A light emitted from an LED light source 5 disposed below the lens 31 is reflected and refracted at the funnel shaped portion 32 and the saw tooth shaped portion 33, thereby spreading an irradiation region of a light in a horizontal direction and suppressing an increase in a luminance at the position directly over the LED light source 5.

Although the lens 31 can guide most lights emitted from the LED light source 5 in a horizontal direction, the shape of the lens is complicated. On the other hand, as shown in FIG. 13(b), while a lens 41 provided with a conical depression 42 on the upper face of a cylindrical substrate has a simple shape, part of lights emitted from the LED light source 5 is reflected at a side face 43 of the cylinder and travels upward through the lens. The light that travels upward through the lens may cause a nonuniformity in chromaticity.

DISCLOSURE OF THE INVENTION

An object of the present invention is to provide a light guide member capable of reducing an unevenness of colors of a flat light source device in the case in which LED light sources of a plurality of colors such as RGB are used.

Another object of the present invention is to provide a light guide member capable of reducing a nonuniformity in luminance of a flat light source device caused by a higher luminance at the section directly over a light source.

Another object of the present invention is to provide a flat light source device in which an irregular luminescent color is reduced in the case in which LED light sources of a plurality of colors such as RGB are used.

Another object of the present invention is to provide a flat light source device in which there is reduced a nonuniformity in luminance of the flat light source device caused by a higher luminance at the section directly over an light source.

Another object of the present invention is to provide a display device provided with the flat light source device described above.

The present invention involves the following modes (1) to (10).

(1) A light guide member for propagating inside a light that has been emitted from an light source disposed on a back face side and for emitting the light outside from a front face, is characterized by comprising:
a light guide portion provided with the back face and the front face that is a reflecting face for propagating in a horizontal direction a light emitted from the light source, and
a protrusion that is protruded downward from the back face of the light guide portion and under which a plurality of light sources generating different colors is disposed,
wherein the protrusion is integrated with the light guide portion,
the protrusion improves a color mixture of lights irradiated inside from a plurality of the light sources, and
the light guide portion propagates in a horizontal direction the lights that have been emitted from a plurality of the light sources and that have been mixed in the protrusion.

(2) A light guide member as defined in above (1) is characterized in that the protrusion is in a cylindrical shape and the light guide portion is provided with a conical depression in such a manner that the depression is disposed at the position of the front face directly over the protrusion.

(3) A light guide member as defined in above (1) or (2) is characterized in that one protrusion is provided with.

(4) A light guide member as defined in above (1) or (2) is characterized in that a plurality of protrusions is provided with.

(5) A light guide member as defined in any one of above (1) to (4) is characterized by further comprising a reflecting part on the side face of the protrusion.

(6) A light guide member as defined in any one of above (1) to (5) is characterized by further comprising a reflecting part on the depressed face of the depression.

(7) A flat light source device is characterized by comprising:
the light guide member as defined in any one of above (1) to (6), and
a plurality of light sources generating colors different from each other, which are disposed below the protrusion of the light guide member.

(8) A flat light source device is characterized by comprising:
the light guide member as defined in above (2), and
a plurality of light sources generating different colors, which are disposed below the protrusion of the light guide member,
wherein the protrusion reflects part of lights emitted from a plurality of the light sources at the side face and guides the lights to the depression, and
the depression reflects the lights reflected at the protrusion and the lights directly irradiated from a plurality of the light sources and propagates the lights in a horizontal direction in the light guide portion.

(9) A display device is characterized by comprising the flat light source device as defined in above (7) or (8).

(10) A display apparatus as defined in above (9) is characterized in that a display portion is a liquid crystal panel.

For the invention in above (1), the protrusion "below" which the light sources are disposed involves both types in which the light sources are disposed directly below the protrusion apart from the bottom face of the protrusion as shown in FIG. 2, and in which the light sources are disposed (buried) in the bottom section of the protrusion as shown in FIG. 6. The expression of disposing the light sources "below" the protrusion can be applied to the both types. In the latter case, for the light guide member and the light sources integrated with the protrusion, the section from which the light sources are excluded is a light guide member.

A light guide member related to the present invention can reduce an unevenness of luminescent color of a flat light source device in the case in which LED light sources of a plurality of colors such as RGB are used.

A light guide member related to the present invention can reduce a nonuniformity in luminance of a flat light source device caused by a higher luminance at the section directly over a light source.

A flat light source device related to the present invention has a satisfactory uniformity of a chromaticity and a luminance.

A display device related to the present invention is a display device such as a liquid crystal display in which the flat light source device described above is used as a back light, thereby implementing a high quality image.

BEST MODE FOR CARRYING OUT THE INVENTION

An embodiment of the present invention will be described below in detail with reference to the drawings. However, the present invention is not restricted to the embodiment.

Figure 1:
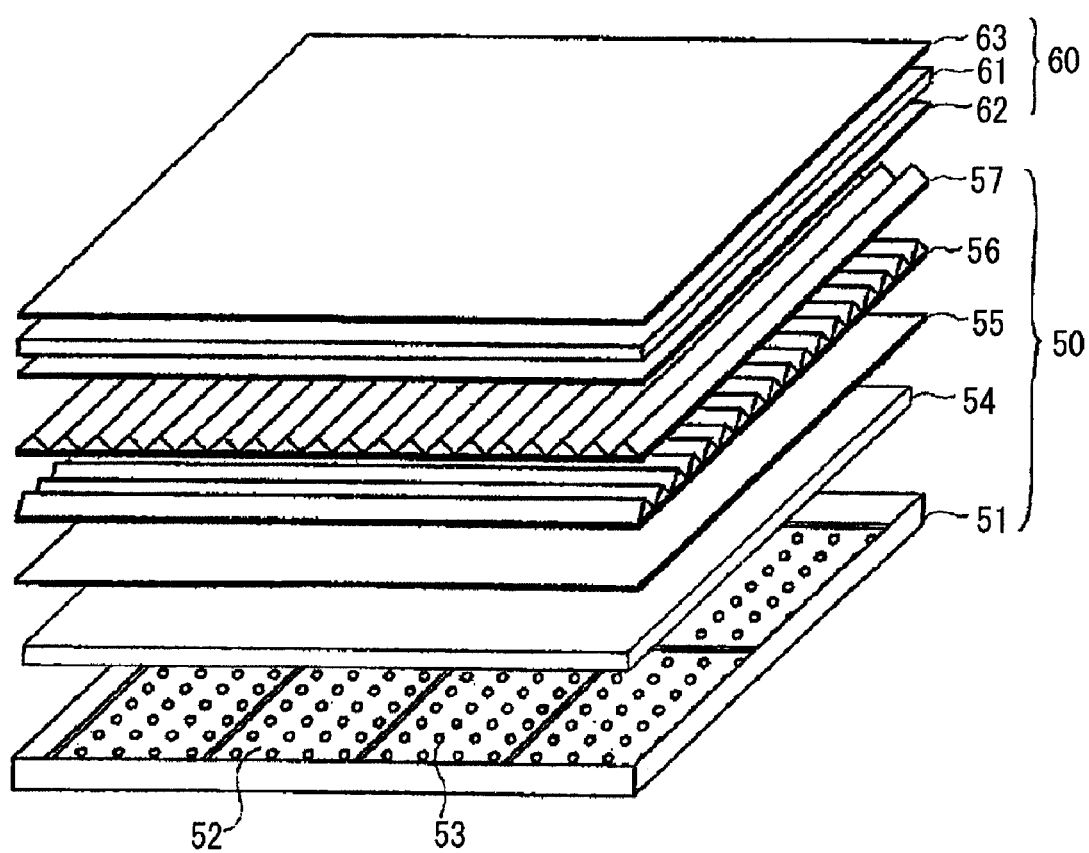
FIG. 1 is a view showing an entire configuration of an example of a liquid crystal display device in which an embodiment of the present invention is applied.

FIG. 1 is a view showing an entire configuration of an example of a liquid crystal display device to which an embodiment of the present invention is applied. A liquid crystal display device to which the embodiment is applied includes, as a flat light source device of a direct lighting type (back light) 50, a back light flame (chassis) 51 that accommodates a light emitting part and an LED substrate (mounting substrate) 52 as a substrate in which a plurality of light emitting diodes (LED) 53, which is a solid-state lighting device, are arranged as illumination sources.

Further, on the LED substrate (mounting substrate) 52, the back light device 50 includes a light guide member 54 which is a feature of the present invention, and which is accommodated in the back light flame (chassis) 51.

Figure 12:
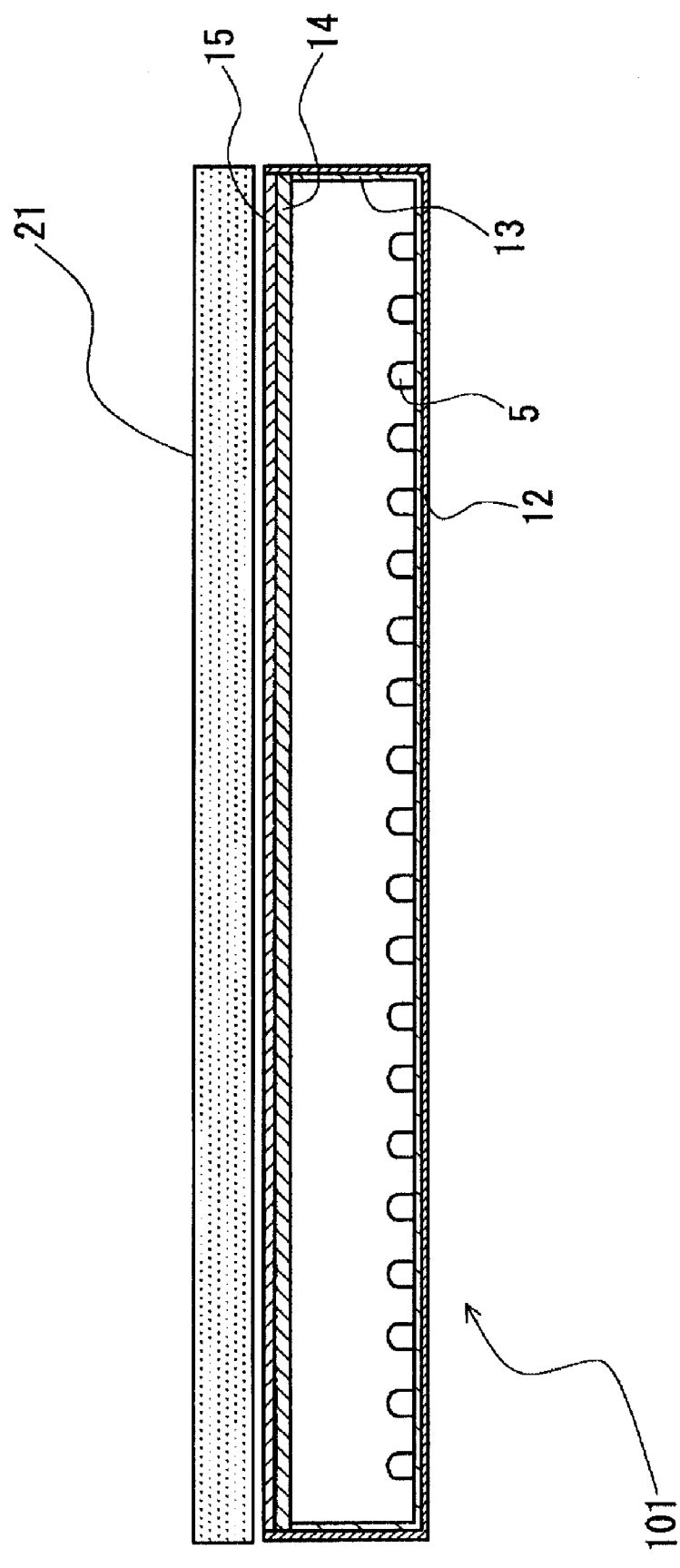
FIG. 12 is a cross sectional view for showing a configuration of a conventional flat light source device of a direct lighting type used in a liquid crystal display.
Figure 13A:
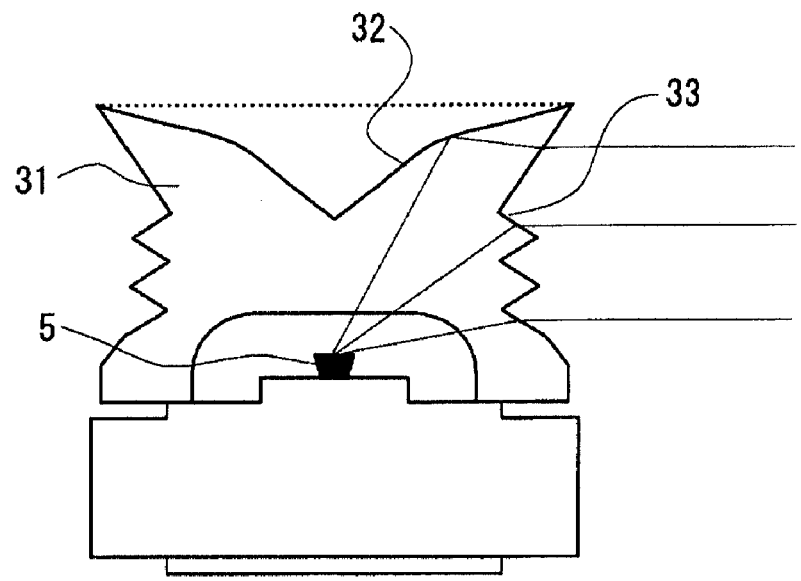
FIGS. 13(*a*) and 13(*b*) are cross sectional views showing a lens for changing a direction of a light emitted from an LED light source to a horizontal direction.
Figure 13B:
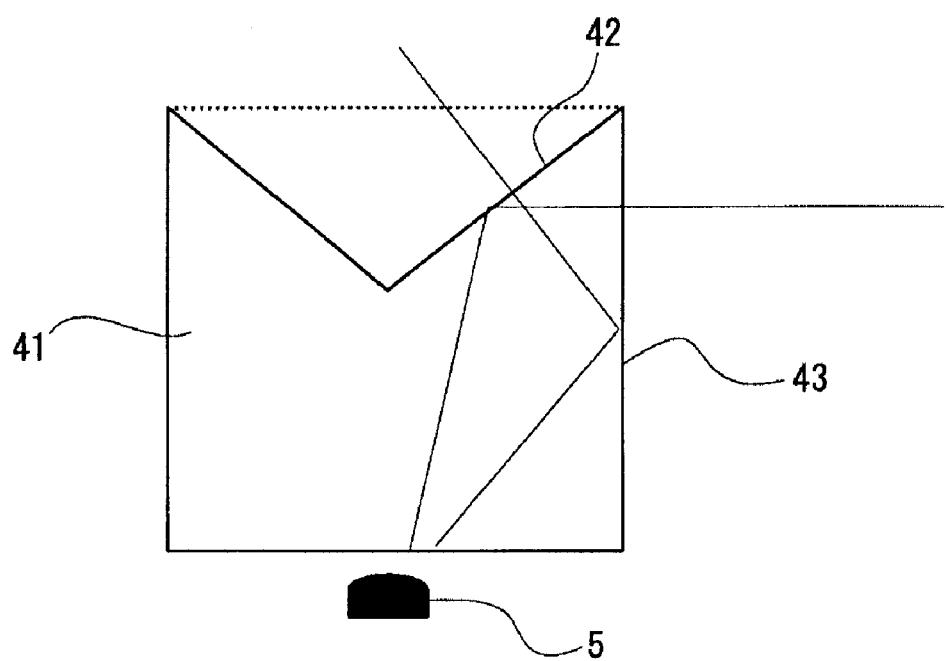

The difference from a conventional direct lighting type back light device as shown in FIG. 12 lies in that the light guide member interposes in a space between the light emitting diodes and the diffusing sheet, thereby enabling to shorten an interval between the light emitting diodes and the diffusing sheet without increasing a thickness of the back light.

On the light guide member, as a laminate of optical compensation sheets, it is equipped with a diffusing sheet 55 that diffuses and scatters a light to render a uniform brightness to the entire surface, and prism sheets 56, 57 that are grating films which exhibit a light collection effect to the forward direction.

Also, as a liquid crystal display module 60, it is equipped with a liquid crystal panel 61 in which a liquid crystal is sandwiched between two glass substrates, and polarizing plates (polarizing filters) 62, 63 for restricting a vibration of a light wave to a certain direction.

Further, the liquid display device is arranged with peripheral members, e.g., a driver LSI (not shown).

The liquid crystal panel 61 is constituted with including many kinds of components that are not shown in the figure. For instance, it is equipped with a display electrode, an active device such as a TFT (Thin Film Transistor), and a liquid crystal, a spacer, a sealing agent, an alignment film, a common electrode, a protection film, a color filter, etc., which are not shown, on or between the two glass substrates.

Figure 2:
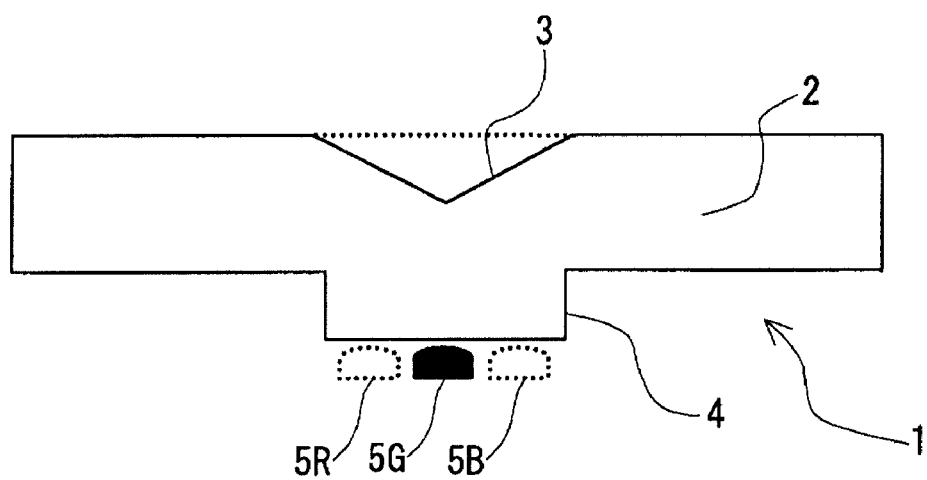
FIG. 2 is a cross sectional view showing an example of a light guide member related to the present invention.
Figure 3:
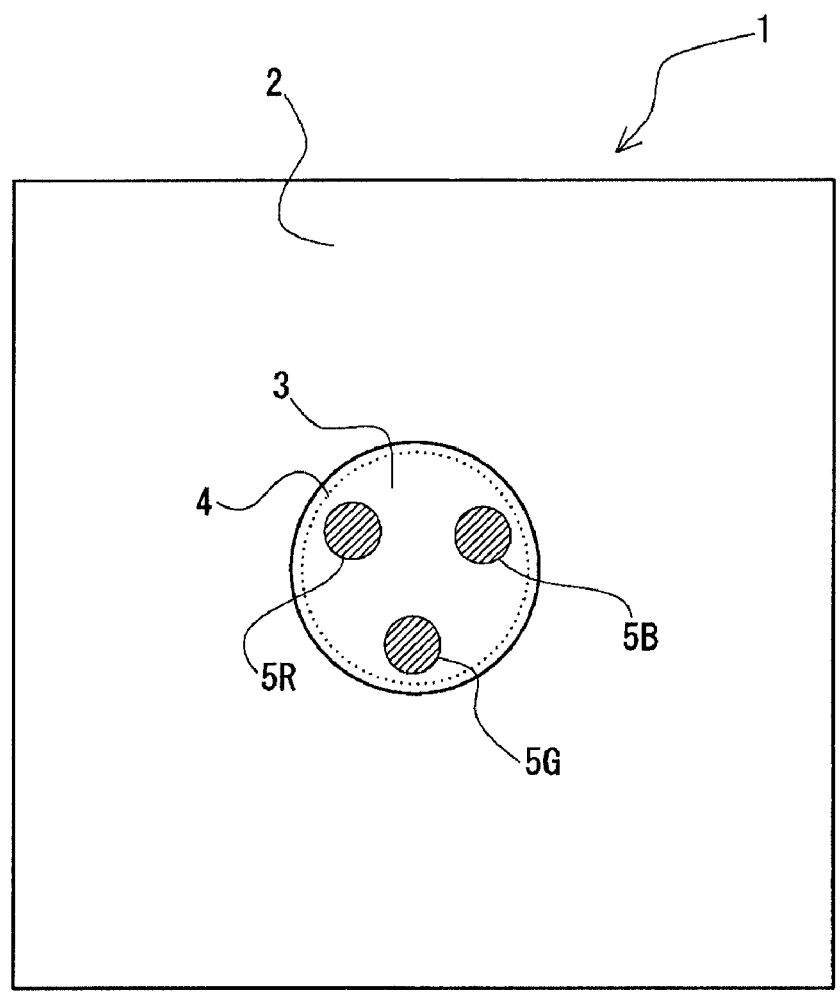
FIG. 3 is a top view showing the light guide member of FIG. 1.

FIG. 2 is a cross sectional view showing an embodiment of a light guide member related to the present invention, and FIG. 3 is a top view thereof. As shown in the figures, a light guide member 1 is provided with a light guide portion 2 having a front face and a back face that are reflecting faces for propagating lights emitted from a red LED light source 5R, a green LED light source 5G, and a blue LED light source 5B in a horizontal direction.

A cylindrical protrusion 4 directly below which LED light sources 5R, 5G, and 5B are disposed is formed in a protruding manner on the back face of the light guide member 2.

A conical depression 3 is formed on the front face at the position directly over the protrusion 4.

Figure 4:
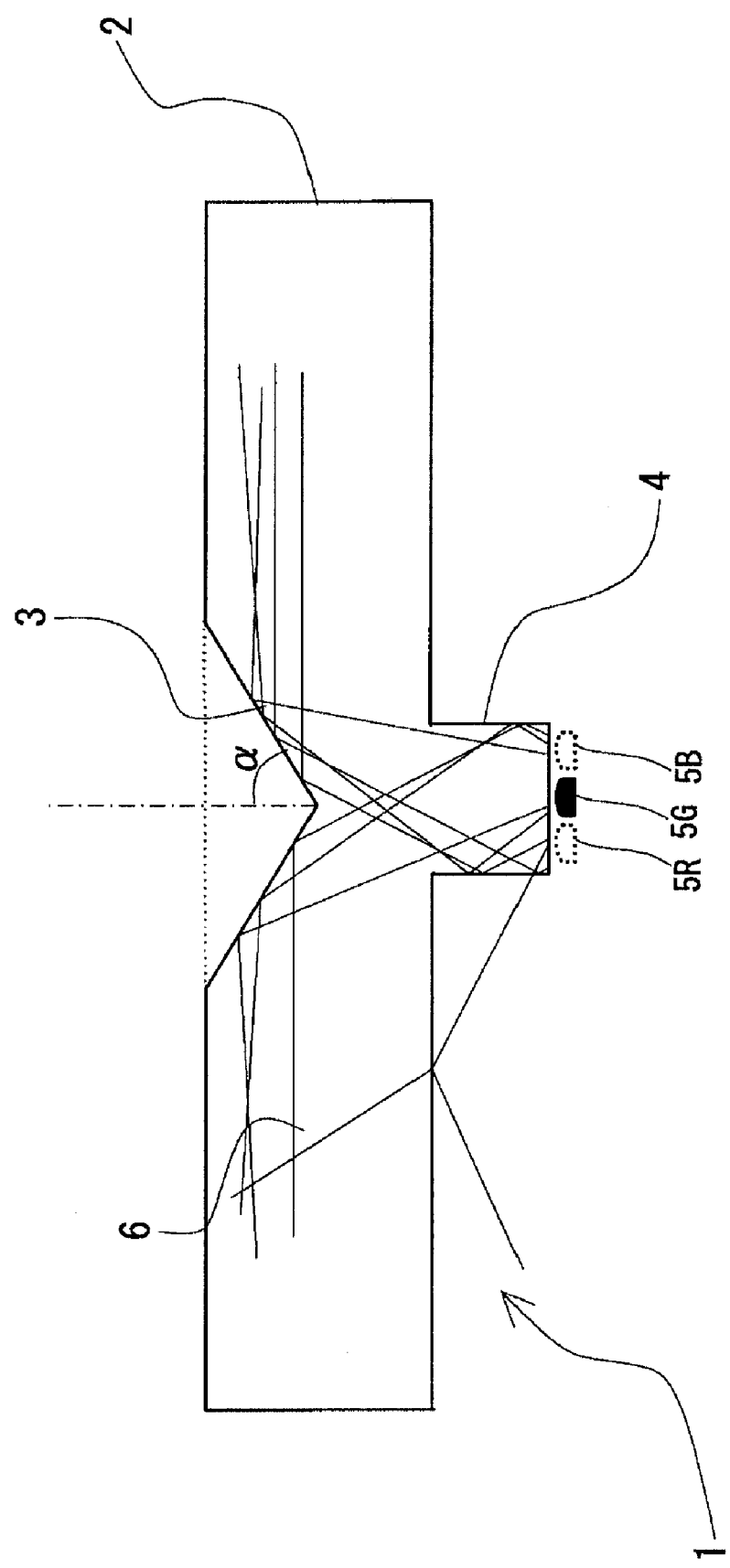
FIG. 4 is a cross sectional view for illustrating a course of a light emitted from a light source in a light guide member related to the present invention.

FIG. 4 is a cross sectional view for illustrating a course of a light emitted from a light source in a light guide member related to the present invention. As shown in the figure, part of each of color lights emitted from the LED light sources 5R, 5G, and 5B is reflected at the side face of the cylindrical protrusion 4, and the reflected lights travel to the depression 3. Of the reflected lights, a light irradiated to the depressed face of the depression 3 at an angle smaller than a total reflection angle is reflected at the depression 3 and is guided in a horizontal direction in the light guide portion 2.

Of lights that have been emitted from the LED light sources 5R, 5G, and 5B and traveled to the protrusion 4, lights in a vertical direction and in a close direction are directly irradiated to the depression 3. The conical depression 3 is formed at an inclination angle a in such a manner that all or most lights directly irradiated from the LED light sources 5R, 5G, and 5B are totally reflected and guided in a horizontal direction in the light guide portion 2. Consequently, most of the lights directly irradiated from the LED light sources 5R, 5G, and 5B to the depression 3 are reflected at the depression 3 and guided in a horizontal direction in the light guide portion 2.

As described above, by the operations of the cylindrical protrusion 4 and the conical depression 3, a part of lights irradiated from the LED light sources 5R, 5G, and 5B disposed directly below the protrusion 4 is guided in a horizontal direction in the light guide portion 2. A light guided in the light guide portion 2 is propagated in the light guide portion 2, and emitted outside from the front face of the light guide portion 2 by forming a reflection part made by a minute uneven structure or made by drawing a dot shape with a reflection ink, for instance, on the back face of the light guide portion 2.

Consequently, by externally extracting lights emitted from the LED light sources 5R, 5G, and 5B after making the lights pass through a light guide member 1, an increase in a luminance at the position directly over the LED light sources 5R, 5G, and 5B is suppressed, and a uniformity of a luminance of a light emitted from a flat light source device can be improved. In particular, the depression 3 is formed at the position directly over the LED light sources 5R, 5G, and 5B, and lights emitted from the light sources are reflected in a horizontal direction, thereby greatly suppressing an unevenness of luminance caused by a higher luminance at the position directly over the light sources.

In the present embodiment, since the protrusion 4 is formed and the LED light sources 5R, 5G, and 5B of three colors are disposed directly below the protrusion, part of each of color lights that have been emitted from the LED light sources 5R, 5G, and 5B and that have traveled to the protrusion 4 travels upward on the course of a reflection at the side face of the protrusion 4. A color mixture is improved by repeating a reflection at the side face of the protrusion 4, and lights of mixed colors are propagated in a horizontal direction in the light guide portion 2. Consequently, lights with less unevenness of colors can be extracted from the front face of the light guide member, thereby improving a uniformity of a chromaticity of a light emitted from a flat light source device.

Figure 5:
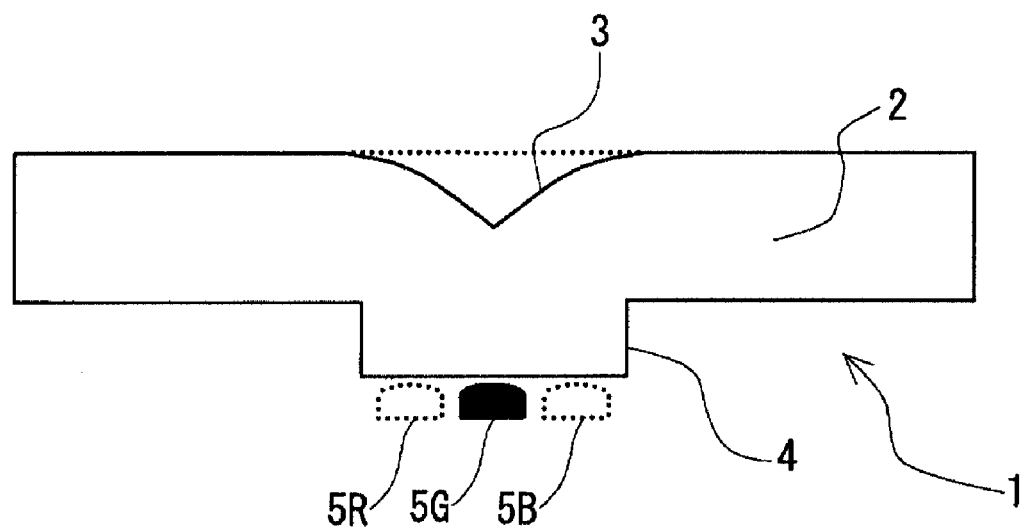
FIG. 5 is a cross sectional view showing another example of a light guide member related to the present invention.

FIG. 5 is a cross sectional view showing another embodiment of a light guide member related to the present invention. As shown in the figure, for the light guide member 1, while the depression 3 of the light guide portion 2 is in a shape similar to a circular cone, the reflecting face is a curved face in such a manner that the angle gradually increases toward the center. In the present invention, the conical shape involves such a shape.

Figure 6:
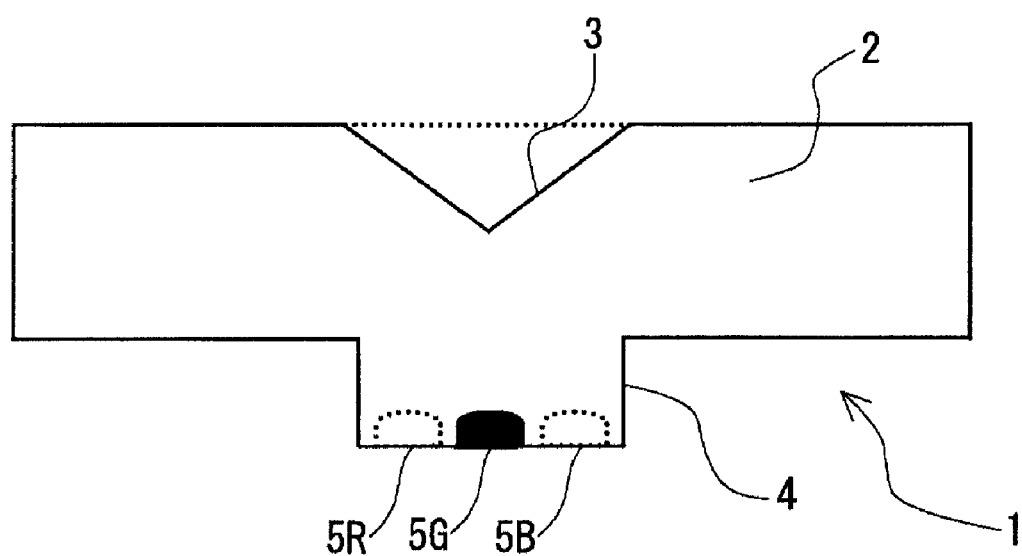
FIG. 6 is a cross sectional view showing another example of a light guide member related to the present invention.

FIG. 6 is a cross sectional view showing another embodiment of a light guide member related to the present invention. As shown in the figure, for the light guide member 1, the LED light sources 5R, 5G, and 5B are buried in the bottom of the cylindrical protrusion 4. Such a light guide member 1 can be fabricated, for instance, by integrating the light guide member 1 onto a substrate in which the LED light sources 5R, 5G, and 5B have been disposed by using a material such as a thermosetting resin, a photo curing resin, and a thermoplastic resin. More specifically, a light guide member can be fabricated by the integration with a method of bonding using an adhesive such as an epoxy resin or of an integral molding to a package provided with a substrate in which a circuit for supplying a current to an LED bare chip is formed, a reflector, and each of LED bare chips of R, G, and B that are mounted in the substrate, in such a manner that the LED bare chips are incorporated in the bottom of the protrusion.

Figure 7:
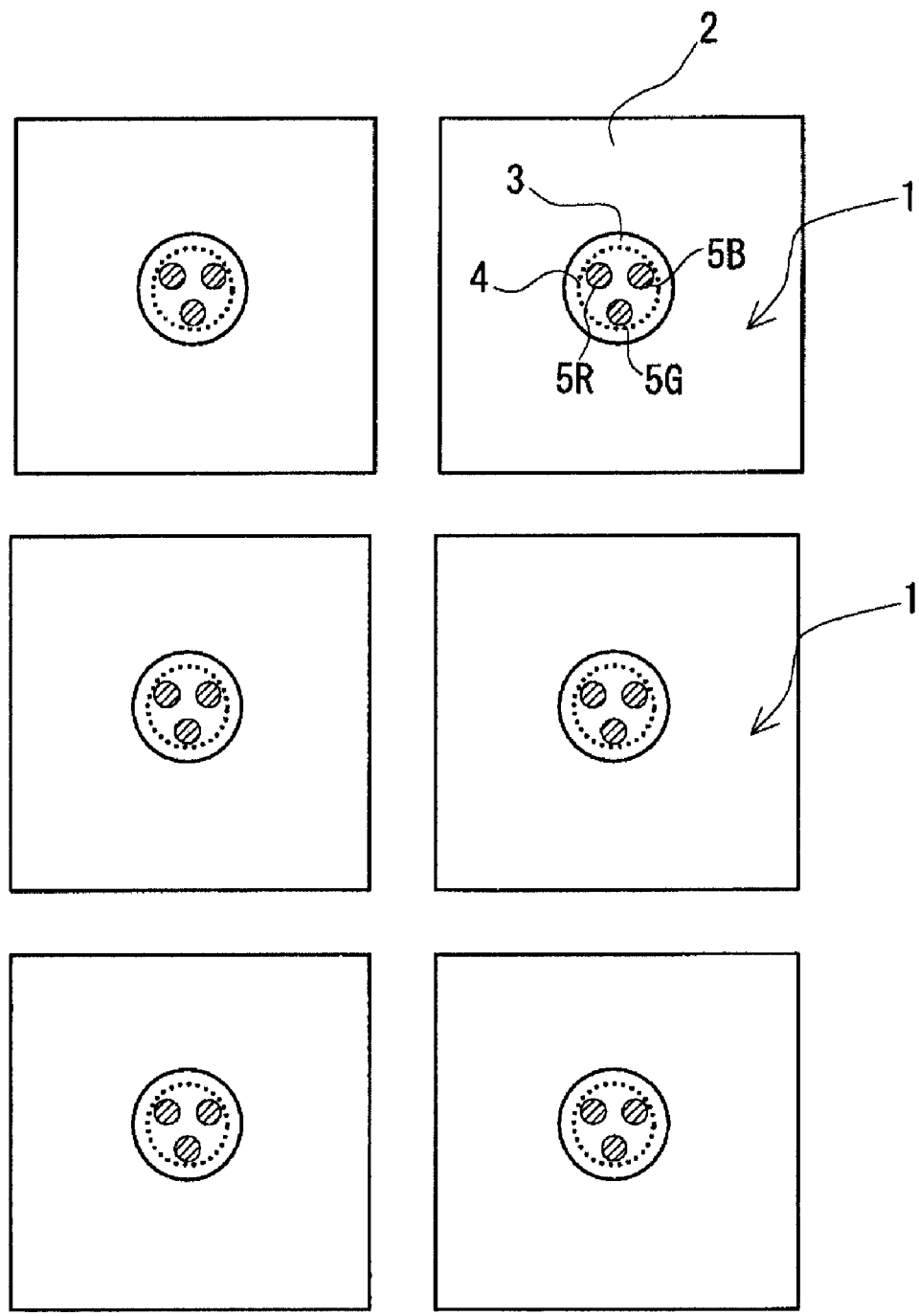
FIG. 7 is a partial top view showing an arrangement of the light sources of a flat light source device and a light guide member related to an example of the present invention.
Figure 11:
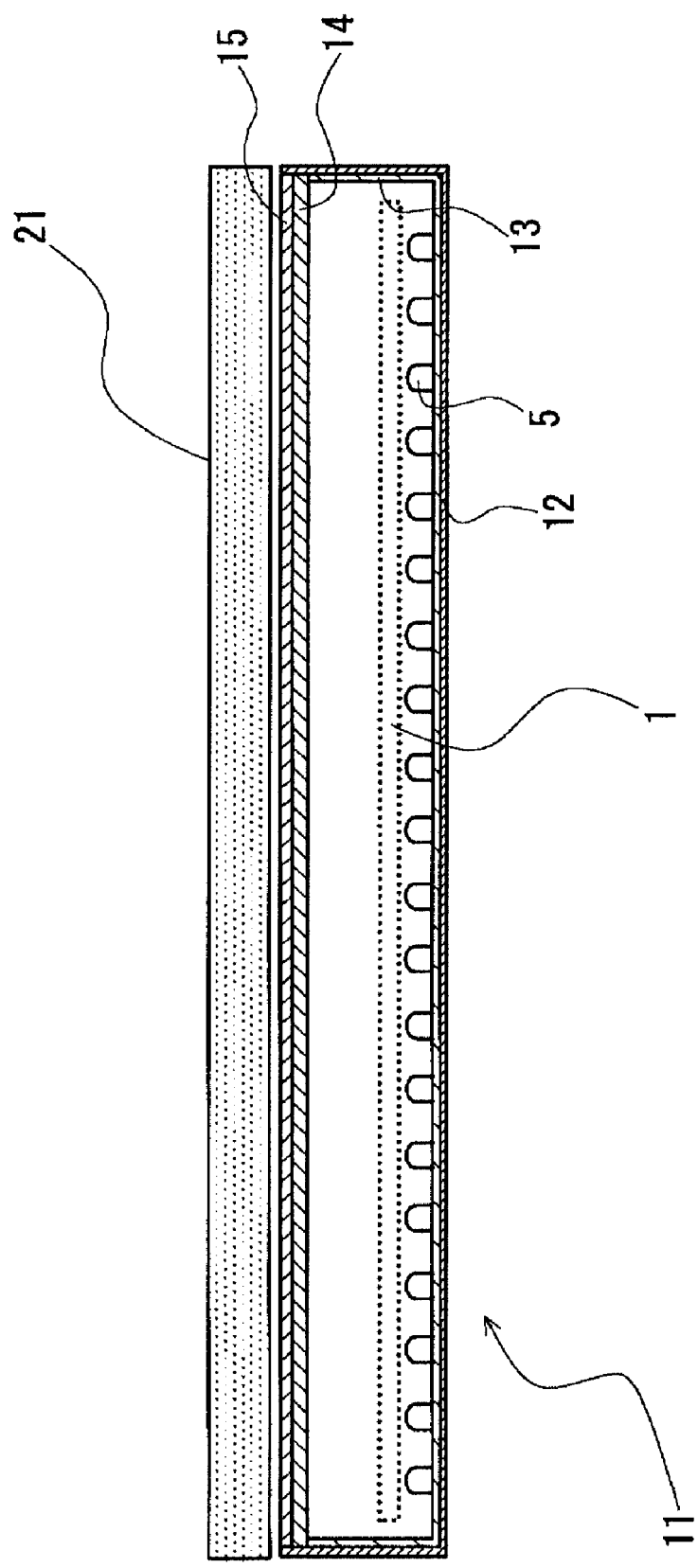
FIG. 11 is a cross sectional view showing an entire configuration of a flat light source device related to an example of the present invention.

FIG. 7 is a part of top view showing an arrangement of the light sources of a flat light source device and a light guide member related to an embodiment of the present invention, and FIG. 11 is a cross sectional view showing an entire configuration. As shown in FIG. 7, for the flat light source device, a plurality of light guide members 1 provided with a protrusion 4 as shown in each embodiment of FIGS. 2 to 6 are regularly arranged in such a manner that the protrusion 4 is disposed at the position directly over one unit of LED light sources 5R, 5G, and 5B for an LED light source in which three LED light sources 5R, 5G, and 5B as one unit are arranged.

As shown in FIG. 11, the flat light source device 11 related to the present embodiment is disposed directly below a liquid crystal panel 21. In the flat light source device 11, LED light sources 5 are disposed in an array pattern on a bottom face of a chassis 12. Moreover, the bottom face and side faces of the chassis 12 are covered by a reflecting sheet 13. Furthermore, above the LED light sources 5, a diffusing sheet 14 and a prism sheet 15 are disposed in the range of 1 to 5 cm for instance apart from the LED light sources 5.

In the case in which lights are generated from the LED light sources 5, the emitted lights are propagated in a horizontal direction in the light guide member 1 disposed thereon and emitted outside. Then, the lights travel directly toward the diffusing sheet 14, or are reflected by the reflecting sheet 13 and travel toward the diffusing sheet 14. The lights are mixed in a space between the LED light sources and the diffusing sheet 14. The mixing is then improved by an irregular reflection in the diffusing sheet 14, thereby implementing a uniform chromaticity and a uniform luminance. The lights that have been irregularly reflected in the diffusing sheet 14 are inclined in a vertical direction by passing through the prism sheet 15. The lights then enter the liquid crystal panel 21.

Figure 8:
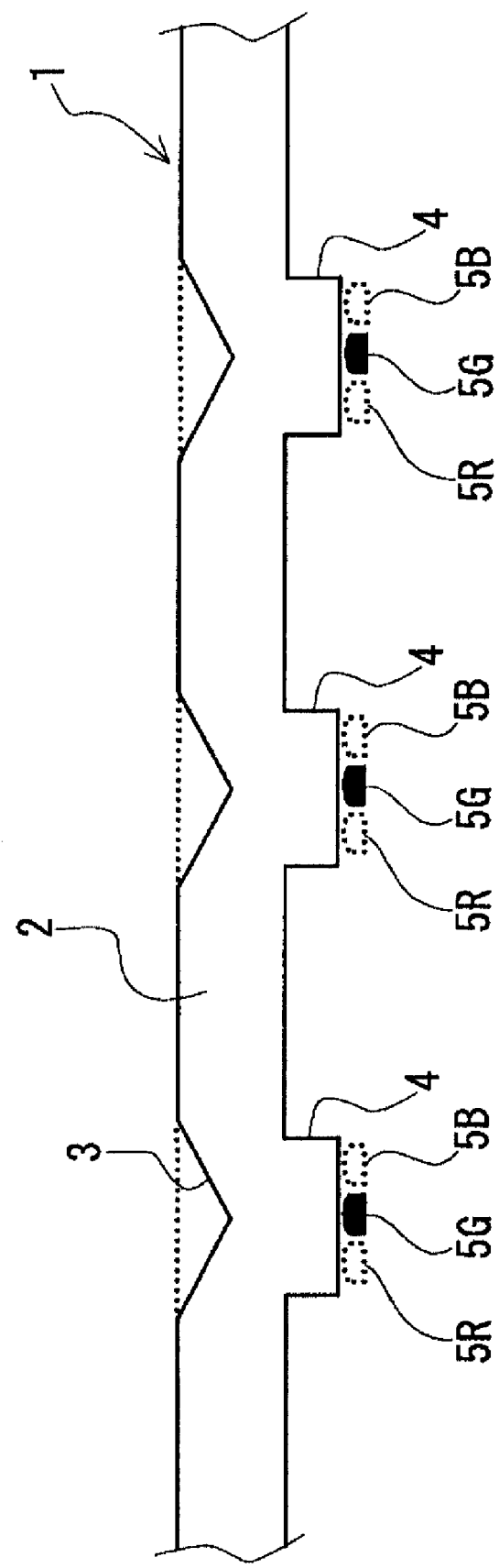
FIG. 8 is a cross sectional view showing another example of a light guide member related to the present invention.
Figure 9:
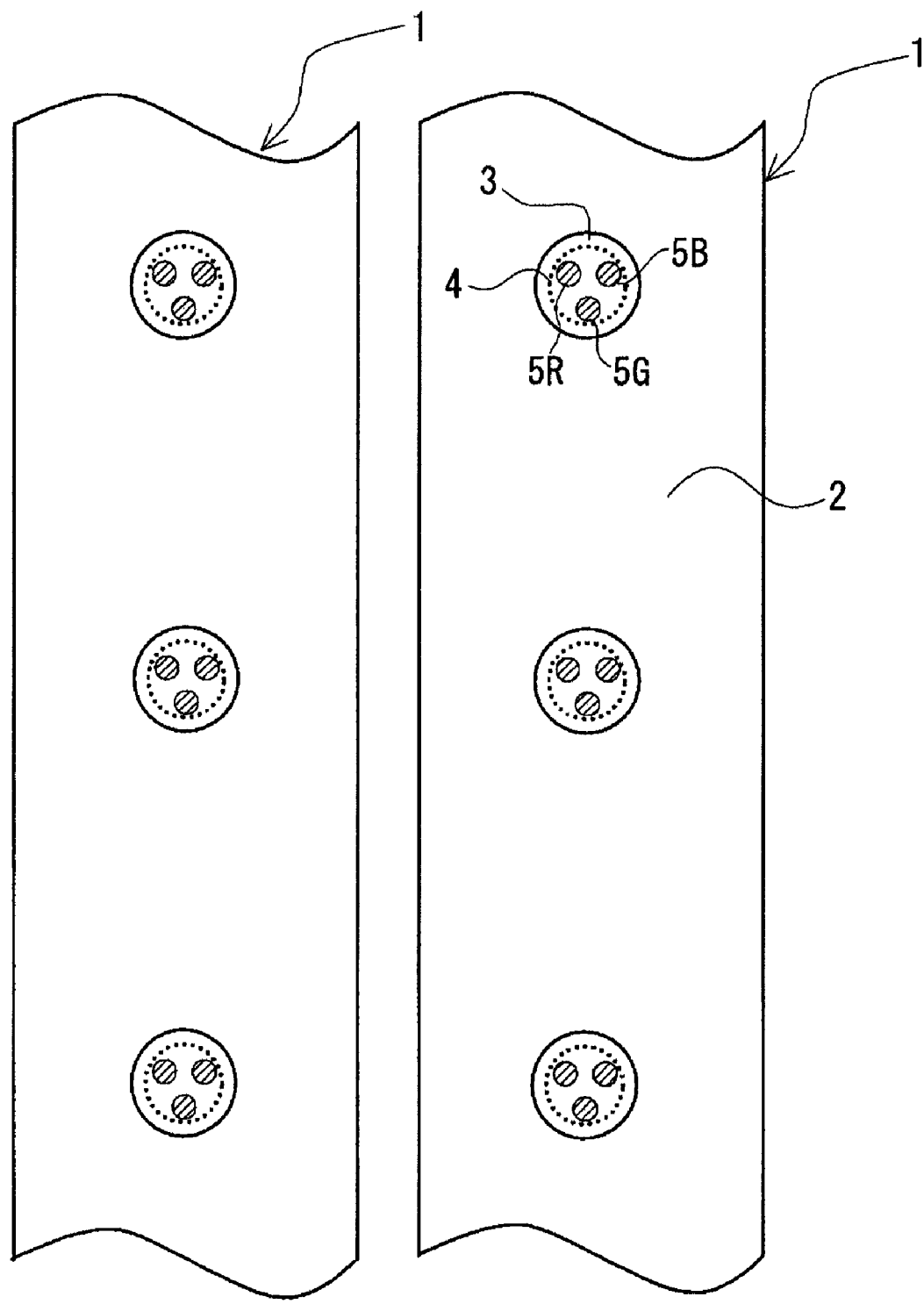
FIG. 9 is a top view showing the light guide member of FIG. 8.

FIG. 8 is a cross sectional view showing another embodiment of a light guide member related to the present invention, and FIG. 9 is a top view thereof. As shown in the figures, the light guide member 1 is provided with a plurality of protrusions 4 arranged linearly.

A conical depression 3 is formed on the front face of the light guide portion 2 at the position directly over each of a plurality of protrusions 4. The LED light sources 5R, 5G, and 5B are disposed directly below each of a plurality of protrusions 4.

As illustrated in FIG. 4, for the light guide member 1, some of lights emitted from the LED light sources 5R, 5G, and 5B is reflected at the side face of the protrusion 4 and is irradiated to the depression 3, and some of lights emitted from the LED light sources 5R, 5G, and 5B travels to the protrusion 4 and is directly irradiated to the depression 3. Part of the above lights is reflected at the depression 3 at an angle smaller than the total reflection angle and is guided in a horizontal direction in the light guide portion 2.

As described above, by the operations of the cylindrical protrusion 4 and the conical depression 3, a light irradiated from the LED light sources 5R, 5G, and 5B disposed directly below the protrusion 4 is guided in a horizontal direction in the light guide portion 2. The light guided in the light guide portion 2 is propagated in the light guide portion 2, and is emitted outside from the front face of the light guide portion 2.

Consequently, by externally extracting lights emitted from the LED light sources 5R, 5G, and 5B after making the lights pass through a light guide member 1, an increase in a luminance at the position directly over the LED light sources 5R, 5G, and 5B is suppressed, and a uniformity of a luminance of a light emitted from a flat light source device can be improved. In particular, the depression 3 is formed at the position directly over the LED light sources 5R, 5G, and 5B, and lights emitted from the light sources are reflected in a horizontal direction, thereby greatly suppressing a nonuniformity in luminance caused by a higher luminance at the position directly over the light sources.

In the present embodiment, since the protrusion 4 is formed and the LED light sources 5R, 5G, and 5B of three colors are disposed directly below the protrusion, part of each of color lights that have been emitted from the LED light sources 5R, 5G, and 5B and that have traveled to the protrusion 4 travels upward on the course of a reflection at the side face of the protrusion 4. A color mixture is improved by the above means, and lights of mixed colors are propagated in a horizontal direction in the light guide portion 2. Consequently, lights with less unevenness of colors can be extracted from the front face of the light guide member, thereby improving a uniformity of a chromaticity of a light emitted from a flat light source device.

Figure 10:
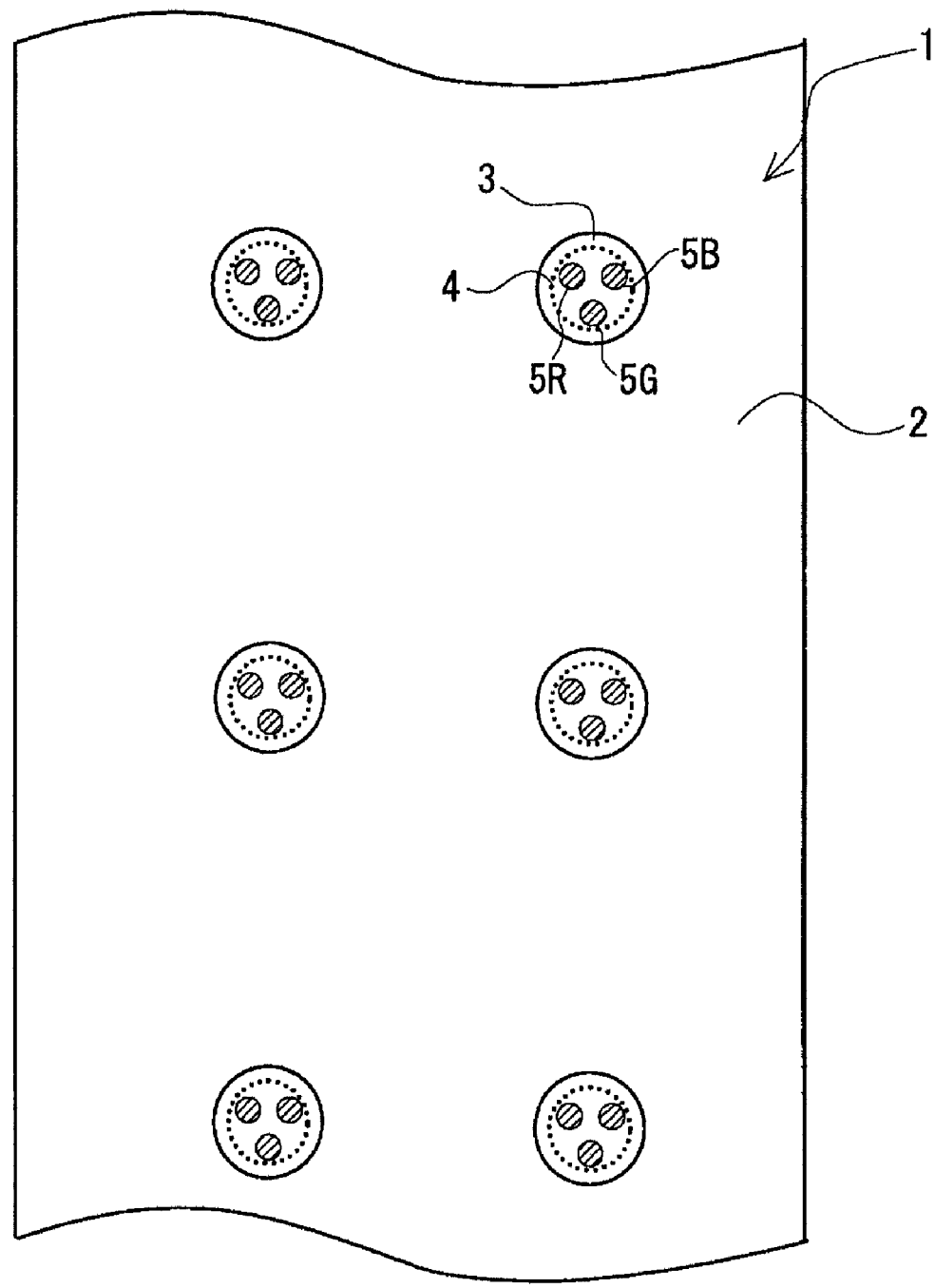
FIG. 10 is a top view showing another example of a light guide member related to the present invention.

While a plurality of protrusions 4 is arranged linearly in the present embodiment, a plurality of protrusions 4 can also be arranged in array-like manner as shown in the top view of FIG. 10.

A light guide member and a flat light source device related to the present invention will be described below in detail further.

A light guide member related to the present invention is a plate shaped member made of a resin, a glass, a composite thereof, or the like capable of propagating a light. A thickness of the light guide portion is, for instance, in the range of 0.1 to 50 mm, preferably in the range of 1 to 30 mm.

In the present invention, a conical depression is formed in the shape in which part of lights that have been reflected at the side face of the cylindrical protrusion and irradiated to the depression and part of lights that have traveled to the protrusion and been directly irradiated to the depression are totally reflected in a direction of the light guide portion. In the case in which the depression has such an operation, a shape of the depression is not strictly required to be a circular cone, and a face of the depression 3 can also be curved for instance as shown in FIG. 5.

The cylindrical protrusion is formed in such a manner that the central axis of the protrusion almost corresponds to that of the conical depression and in such a manner that part of lights that have been emitted from the light sources and that have been reflected at the side face of the protrusion is irradiated to the depression at an angle smaller than a total reflection angle and is totally reflected in a direction of the light guide portion. In general, a diameter of the protrusion is almost equivalent to or smaller than that of the most front face of the conical depression.

A reflecting layer for reflecting a light irradiated from the light source into the protrusion can be formed on the side face of the cylindrical protrusion. By forming the reflecting part, part of lights irradiated into the protrusion is prevented from being emitted outside, thereby increasing an amount of lights irradiated into the light guide portion.

Moreover, the depressed face of the conical depression can be provided with a reflecting part for reflecting a light that has reached the depressed face directly through the protrusion from the light source or reached the depressed face after being reflected at the side face of the protrusion. By forming the reflecting part, the above lights are prevented from being emitted outside from the depression, thereby improving a light propagation in a horizontal direction in the light guide portion.

As the above reflecting part, a white paint is coated, or there are mentioned a white layer formed by printing and a metal shiny layer formed by aluminum deposition.

The flat light source device related to the present invention is provided with a plurality of light sources disposed at a specified pitch and one or a plurality of light guide plates in such a manner that the light guide plate faces to a plurality of the light sources and the above protrusion disposed at the position over a plurality of the light sources with different luminescent colors.

A plurality of the above light sources is mounted on a substrate, and the light guide member is disposed in front of the substrate with the light sources interposed. If necessary, a reflecting member is disposed on the back face of the light guide member.

The disposed position of each light source corresponding to the protrusion of the light guide member is not restricted in particular in the case in which part of lights that have traveled to the protrusion from each light source is reflected at the side face of the protrusion and part of lights from each light source is propagated in a horizontal direction in the light guide portion by a reflection at the depression. However, in order to carry out a sufficient color mixture in the protrusion, it is preferable to uniformly dispose a plurality of the light sources of each color at the position close to the periphery of the bottom face of the protrusion.

As a light source, for instance, a light emitting diode device with a size in the range of several hundreds μm to 1 mm can be used. As a specified type of an LED light source using a light emitting diode device, there are mentioned a bare chip type, a type in which a light emitting diode device is mounted in a package, a type in which a light emitting diode device is integrated with a member having a lens function, and so on.

As a mode in which LED light sources are disposed on the substrate, it is preferable to dispose light emitting diode devices of red (R), green (G), and blue (B) on the substrate and to emit a white color light by carrying out a color mixture of the three primary colors. In such a case, as illustrated in the above embodiments, it is preferable to dispose each light source of RGB below one protrusion.

In the case in which the planar light source device is for a white color illumination, an LED light source with a so-called intermediate color such as yellow and orange can also be used to emit a white color light by carrying out a color mixture with a light emitted from another LED light source. It is not required that each light emitting diode devices of each color is used as one component. In case where these are composed of three primary color of R, G, B, each light emitting diode devices of each different color may be used as one component, or a number of light sources may be altered according to a color, e.g., one R, two G and one B, etc.

While a disposition pitch of LED light sources is not restricted in particular, as the pitch is smaller, a color mixture is better in general.

As a substrate on which LED light sources are disposed, there is mentioned, for instance, a substrate in which a circuit is formed for supplying a current to an LED light source or a laminate of a circuit substrate and a heat radiating substrate. An anode and a cathode of the LED light source are electrically connected to an electrode pad on the circuit substrate. As a method of obtaining the circuit substrate, there is mentioned, for instance, a method of bonding a copper foil to an insulating resin substrate such as a glass epoxy substrate and etching the copper foil in a circuit pattern.

The radiating substrate is a substrate made of a material with a high thermal conductivity, such as a metal such as aluminum, copper, and a stainless steel, or a ceramics such as aluminum nitride. By bonding the radiating substrate to the back face of the circuit substrate, a heat generated from a light emitting diode device is radiated.

As a method of fixing an LED light source onto the substrate, there is mentioned, for instance, a method of a connection by using a connecting means with a small thermal resistance, such as a method of forming a through hole at the section on which an LED light source is mounted in the circuit substrate and bonding the LED light source onto the radiating substrate exposed to the through hole by using a silver paste or a thermal conductivity silicone, and a method of thermally melting a metal such as a lead solder and a gold-tin eutectic solder and of connecting the anode and cathode of a bare chip with the electrode pad of the circuit substrate by means of a face down bonding through a bump.

As a reflecting part disposed on the back face of the light guide member, there are mentioned, for instance, a white reflecting sheet bonded to the back face of the light guide member, a film of a white paint printed on the back face of the light guide member, and a white reflecting layer (resist) formed on the circuit substrate.

Moreover, for the protrusion of the light guide member, a package provided with a circuit substrate, a reflector, and a light source of each color mounted on the circuit substrate can be integrated with the protrusion.

In front of the light guide member in front of the LED light source disposed on the substrate, a diffusing sheet as shown in FIG. 11 is preferably disposed, with a distance according to requirement to lower a nonuniformity in luminance and a nonuniformity in chromaticity. For instance, the light sources are disposed on the bottom of the chassis in which the bottom face and the side face are covered by a reflecting sheet, and a diffusing sheet is disposed on the upper face side of the chassis.

In the present invention, a light scattering dot can be formed on the front face and the back face of the light guide member in order to improve a uniformity of a luminance if necessary. The light scattering dot can be formed by the dot printing of a scattering ink or the integral molding with the light guide member.

The display device related to the present invention is provided with the flat light source device as described above. Typically, a display portion of the display device is a liquid crystal panel, and the flat light source device is disposed on the back face of the liquid crystal panel as a back light as shown in FIG. 11.

EXAMPLES

While the detailed examples of the present invention will be described below, the present invention is not restricted to the examples.

Example 1

There was fabricated a light guide member, as shown in FIG. 4, provided with a square light guide portion with a side of 50 mm and with a thickness of 12 mm, a cylindrical protrusion with a diameter of 6 mm and with a height of 6 mm, and a conical depression with a diameter of 14 mm and with an inclination angle of 60 degrees by cutting an acrylic plate with a thickness of 18 mm (product name: SUMIPEX, manufactured by Sumitomo Chemical Co., Ltd.) by using a milling machine.

There was then fabricated an LED package in which a 0.5 W class red LED chip and 1 W class blue and green LED chips were mounted/disposed at a 1.5 mm pitch at vertex positions of an almost equilateral triangle in a package in which a copper wiring pattern capable of mounting an LED on a square substrate with a side of 13 mm was formed and in which a reflector was formed with a bottom face diameter of 6 mm, with a top face diameter of 6 mm, and with a height of 0.5 mm.

A material of the reflector was the white GENESTAR (Registered Trademark, highly heat resistant polyamide resin of a white type manufactured by KURARAY CO., LTD.), and the epoxy resin (product name: NLD-SL-1101 manufactured by SANYU REC CO. LTD.) was filled in the LED chips to seal the LED chips.

The above light guide member was then bonded to the LED package in such a manner that the periphery of the bottom face of the protrusion corresponds to the periphery of the top face of the reflector. An epoxy adhesive of a room temperature setting type (product name: Alardyte manufactured by SHOWA HIGHPOLYMER CO., LTD.) was used as an adhesive for the bonded face.

Example 2

There was fabricated a light guide member with a size equivalent to that of Example 1, provided with a cylindrical counter boring hole with a diameter of 4 mm on the bottom face of the protrusion, by metal molding using the epoxy resin (product name: NLD-SL-1101 manufactured by SANYU REC CO. LTD.).

Moreover, an LED package equivalent to that of Example 1 was fabricated except that there was no reflector and no epoxy resin sealing.

The above epoxy resin was filled into the cylindrical counter boring hole of the protrusion of the light guide member, and the light guide member was bonded to the LED package in such a manner that each of LED chips of red, green, and blue is disposed in the cylindrical counter boring hole. The heat setting at 100° C. for two hours and then at 130° C. for three hours was carried out to integrate the light guide member with the LED package.

Example 3

An LED package with a light guide member was fabricated similarly to Example 1 except that a white reflecting layer was formed on the side face of the protrusion of Example 1. The white reflecting layer was formed by coating a pigment paint (product name: White type number 01 of Acrylic lacquer spray manufactured by Nippon Paint Home Products Co., Ltd.) with a thickness of approximately 100 mm.

Comparison Example 1

An LED package with a light guide member was fabricated similarly to Example 1 except that there was used a light guide member provided with only a depression without the protrusion of Example 1. The light guide member was bonded to the LED package in such a manner that the central axis of the depression corresponds to that of the LED package. An epoxy adhesive of a room temperature setting type (product name: Alardyte manufactured by SHOWA HIGHPOLYMER CO., LTD.) was used as an adhesive for the bonded face.

The LED package with a light guide member fabricated in Examples 1 to 3 and the comparison example 1 was disposed and fixed to an aluminum chassis with a front face opened with a bottom face of longitudinal 60 mm ×transverse 60 mm and with a depth of 40 mm. A reflecting part in which white reflecting films (product name: Lumirror 60L (Registered Trademark) manufactured by Toray Industries, Inc.) were bonded to each other was formed on the inside faces of the chassis except for the opening portion.

Moreover, a diffusing sheet (polycarbonate, product name: PC9391-50HL manufactured by TEIJIN CHEMICALS LTD.) with a thickness of 1 mm was fixed to the front face of the opening portion of the aluminum chassis to fabricate a flat light source device.

Then, currents of 180 mA (red), 250 mA (green), and 90 mA (blue) were applied to LED chips, and a total average luminance and a chromaticity coordinate on the diffusing sheet were measured by the calorimeter (product name: CS1000 manufactured by Konica Minolta, Inc.). Moreover, there were measured a dispersion of a luminance of each point ([(maximum luminance−minimum luminance)/ average luminance]×100%) and a dispersion of the chromaticity coordinate of each point (a difference of the maximum value from the minimum value of chromaticity coordinates X and Y) in the case in which each point was measured at the 3 mm pitch on the diagonal line from the point corresponding to the normal line at the center position of the lens on the diffusing sheet. The measured results are listed in Table 1.

TABLE 1

|  | Average luminance (cd/m$^2$) | Luminance dispersion (%) | Average chromaticity (X, Y) | Chromaticity dispersion (ΔX, ΔY) |
| --- | --- | --- | --- | --- |
| Example 1 | 2200 | 45 | (0.29, 0.29) | (0.012, 0.012) |
| Example 2 | 2800 | 35 | (0.29, 0.29) | (0.015, 0.014) |
| Example 3 | 2700 | 42 | (0.30, 0.31) | (0.019, 0.018) |
| Comparison example 1 | 1900 | 51 | (0.30, 0.32) | (0.019, 0.019) |

There were obtained satisfactory results in which the total luminance of the examples 1 to 3 is higher than that of the comparison example 1, and the luminance dispersion is smaller. In particular, a reduction effect of the luminance dispersion is large in the example 2.

The invention claimed is:

1. A light guide member for propagating inside a light that has been emitted from an light source disposed on a back face and for emitting the light outside from a front face, comprising:
   a light guide portion provided with the back face and the front face that is a reflecting face for propagating in a horizontal direction a light emitted from the light source, and
   a protrusion that is protruded downward from the back face of the light guide portion and on which a plurality of light sources generating colors different from each other is disposed,
   wherein the protrusion is integrated with the light guide portion such that the protrusion and the light guide portion form a single integral member,
   the plurality of light sources are disposed directly on a back face of the protrusion,
   the protrusion is in a cylindrical shape and the light guide portion is provided with a conical depression in such a manner that the conical depression is disposed at the position of the front face directly over the protrusion,
   the protrusion improves a color mixture of lights irradiated inside from a plurality of the light sources, and
   the light guide portion propagates in a horizontal direction the lights that have been emitted from a plurality of the light sources and that have been mixed in the protrusion.

2. A light guide member as defined in claim 1, wherein one protrusion is provided with.

3. A light guide member as defined in claim 1, wherein a plurality of protrusions is provided with.

4. A light guide member as defined in claim 1, further comprising a reflecting part on a side face of the protrusion.

5. A light guide member as defined in claim 1, further comprising a reflecting part on a depressed face of the conical depression.

6. A flat light source device comprising:
   the light guide member as defined in claim 1, and
   the plurality of light sources generating colors different from each other, which are disposed below the protrusion of the light guide member.

7. A display device comprising the flat light source device as defined in claim 6.

8. A flat light source device comprising:
   the light guide member as defined in claim 1, and
   the plurality of light sources generating colors different from each other, which are disposed below the protrusion of the light guide member,
   wherein the protrusion reflects part of lights emitted from the plurality of the light sources at a side face thereof and guides the lights to the conical depression, and
   the conical depression reflects the lights reflected at the protrusion and the lights directly irradiated from the plurality of the light sources and propagates the lights in the horizontal direction in the light guide portion.

9. A display device as defined in claim 7, wherein a display portion is a liquid crystal panel.

10. A display device comprising the flat light source device as defined in claim 8.

11. A light guide member as defined in claim 1, wherein the protrusion has a cylindrical cross-section throughout.

12. A light guide member as defined in claim 1, further comprising a reflecting part on a side face of the protrusion.

13. A light guide member as defined in claim 1, wherein the plurality of light sources are disposed on an inside of the back face of the protrusion such that the plurality of light sources are embedded within the protrusion.

14. A light guide member as defined in claim 1, wherein the plurality of light sources are disposed on an inside of the back face of the protrusion such that the plurality of light sources are embedded within the protrusion.

15. A light guide member as defined in claim 1, wherein the conical depression causes the lights that have been emitted from the plurality of the light sources to be spread evenly from a center of the conical depression out in every direction.

* * * * *